United States Patent
Lee et al.

(10) Patent No.: US 7,797,014 B2
(45) Date of Patent: Sep. 14, 2010

(54) APPARATUS AND METHOD FOR PERFORMING UPLINK POWER CONTROL IN BROADBAND WIRELESS ACCESS SYSTEM

(75) Inventors: Yong-Hwan Lee, Seoul (KR); Jin-Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 11/751,272

(22) Filed: May 21, 2007

(65) Prior Publication Data

US 2007/0275727 A1 Nov. 29, 2007

(30) Foreign Application Priority Data

May 24, 2006 (KR) .................. 10-2006-0046572

(51) Int. Cl.
 *H04B 7/00* (2006.01)
 *H04Q 7/20* (2006.01)
(52) U.S. Cl. .................. 455/522; 455/69; 455/515; 455/434
(58) Field of Classification Search .............. 455/522, 455/69, 67.11, 515, 434, 517, 464, 501, 63.1, 455/67.13, 446, 127.2, 126; 370/329, 208
See application file for complete search history.

(56) References Cited

U.S. PATENT DOCUMENTS

| 2002/0077138 A1* | 6/2002 | Bark et al. .................. 455/522 |
| 2004/0102205 A1 | 5/2004 | Zhang et al. |
| 2005/0192042 A1 | 9/2005 | Au et al. |
| 2006/0019694 A1* | 1/2006 | Sutivong et al. ............ 455/522 |
| 2006/0045046 A1* | 3/2006 | Kim et al. .................... 370/329 |

FOREIGN PATENT DOCUMENTS

JP 10-322270 A 12/1998

* cited by examiner

*Primary Examiner*—John Lee
(74) *Attorney, Agent, or Firm*—Jefferson IP Law, LLP

(57) ABSTRACT

An apparatus and method for uplink (UL) power control in a broadband wireless access (BWA) communication system are provided. In a communication method for a base station (BS), the channel gain, noise power and speed of each MS are determined, and the maximum allowable power of each mobile station (MS) are calculated using the determined channel gain, noise power and speed of each MS. Because the UL power is controlled according to the speed of the MS and the distance from the BS, the method can provide higher system capacity than the conventional power adaptation scheme.

20 Claims, 8 Drawing Sheets

APPARATUS AND METHOD FOR PERFORMING UPLINK POWER CONTROL IN BROADBAND WIRELESS ACCESS SYSTEM

PRIORITY

This application claims the benefit under 35 U.S.C. §119(a) to a Korean patent application filed in the Korean Intellectual Property Office on May 24, 2006 and assigned Ser. No. 2006-46572, the entire disclosure of which is hereby incorporated by reference.

JOINT RESEARCH AGREEMENT

The claimed invention was made by, on behalf of, and/or in connection with one or more of the following parties to a joint university-corporation research agreement: Samsung Electronics Co., Ltd. and Seoul National University Industry Foundation. The agreement was in effect on or before the date the claimed invention was made, and the claimed invention was made as a result of activities undertaken within the scope of the agreement.

BACKGROUND OF THE INVENTION

1. Field of the Invention

The present invention relates generally to an apparatus and method for performing uplink (UL) power control in a broadband wireless access (BWA) system. More particularly, the present invention relates to an apparatus and method for reducing a UL inter-carrier interference (ICI) in a BWA system.

2. Description of the Related Art

Extensive research is being conducted to provide various Quality of Service (QoS) features having a data rate of about 100 Mbps in the advanced fourth-generation (4G) communication system. The 4G communication system is evolving to provide mobility and high QoS in a BWA system such as a Local Area Network (LAN) system and a Metropolitan Area Network (MAN) system. The BWA system uses an Orthogonal Frequency Division Multiplexing (OFDM)/Orthogonal Frequency Division Multiple Access (OFDMA) scheme.

In general, schemes for link adaptation to address signal attenuation depending upon a distance of a mobile station (MS) from a base station (BS) include a rate adaptation scheme and a power adaptation scheme. Depending on the scheme being used, an OFDMA system adjusts a data rate or a power level for uplink (UL) transmission in adaptation to the signal attenuation depending on the distance from a BS, thereby providing the desired link performance. Compared to the power adaptation scheme, the rate adaptation scheme provides a larger system capacity by changing a data transmission rate depending on the channel conditions of respective mobile stations (MSs).

FIG. 1 is a graph for comparing a rate adaptation scheme and a power adaptation scheme in terms of carrier-to-interference ratio (CIR), and FIG. 2 is a graph for comparing a rate adaptation scheme and a power adaptation scheme in terms of Tx power.

As illustrated in FIGS. 1 and 2, the rate adaptation scheme transmits signals from all MSs in a cell to a BS at the same power regardless of the distance from the BS and changes a data transmission rate in consideration of a CIR change depending on the distance from the BS. Unlike the rate adaptation scheme, the power adaptation scheme increases the Tx power of an MS by the amount of power attenuation depending on the distance from a BS, so that all the MSs in a cell can have the same CIR.

However, when a data rate scheme for UL transmission in the OFDMA system is adapted to address signal attenuation depending on the distance from a BS, a severe ICI may occur due to the difference of speed and Rx power between MSs.

FIG. 3 is a graph illustrating a severe ICI problem that occurs due to the difference of BS Rx signal power between an MS located at the center of a cell and an MS located at the boundary of the cell when all the MSs in the cell transmit UL signals at the same Tx power.

As illustrated in FIG. 3, a signal transmitted from the MS located at the cell center undergoes small attenuation and is thus received at high power in a BS, while a signal transmitted from the MS located at the cell boundary undergoes large attenuation and is thus received at low power in the BS. In this case, the signal transmitted from the MS located at the cell boundary acts as an ICI with the signal transmitted from the MS located at the cell center, which may cause performance degradation.

Therefore, in the uplink of the OFDMA system, the Tx power of an MS that has a large channel gain (i.e., small signal attenuation) and a high speed needs to be reduced in order to reduce a severe ICI caused by another MS.

SUMMARY OF THE INVENTION

An aspect of the present invention is to address at least the above problems and/or disadvantages and to provide at least the advantages described below. Accordingly, an aspect of the present invention is to provide an apparatus and method for reducing an ICI in a BWA system.

Another aspect of the present invention is to provide an apparatus and method for reducing a UL ICI in a BWA system.

Still another aspect of the present invention is to provide an apparatus and method for performing UL power control in a BWA system.

According to one aspect of the present invention, a BS apparatus in a BWA system is provided. The BS apparatus includes a determiner for determining the channel gain, noise power and speed of each MS and a calculator for calculating the maximum allowable power of each MS using the determined channel gain, noise power and speed of each MS.

According to another aspect of the present invention, an MS apparatus in a BWA system is provided. The MS apparatus includes a receiver for receiving, from a BS, the maximum allowable power that is determined according to the UL channel gain and speed of the MS, a generator for generating Tx symbols and a power controller for controlling the Tx power of the generated Tx symbols according to the received maximum allowable power.

According to still another aspect of the present invention, a communication method for a BS in a BWA system is provided. The method includes determining the channel gain, noise power and speed of each MS and calculating the maximum allowable power of each MS using the determined channel gain, noise power and speed of each MS.

According to even another aspect of the present invention, a communication method for an MS in a BWA system is provided. The method includes estimating the speed of the MS, determining a channel gain and noise power using a UL channel value received from a BS, calculating the maximum allowable power using the channel gain, the noise power and the speed of the MS, and controlling the Tx power of Tx symbols according to the calculated maximum allowable power.

BRIEF DESCRIPTION OF THE DRAWINGS

The above and other objects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a description will be given of a scheme for reducing a UL ICI in an OFDMA BWA system according to an exemplary embodiment of the present invention.

Figure 1:
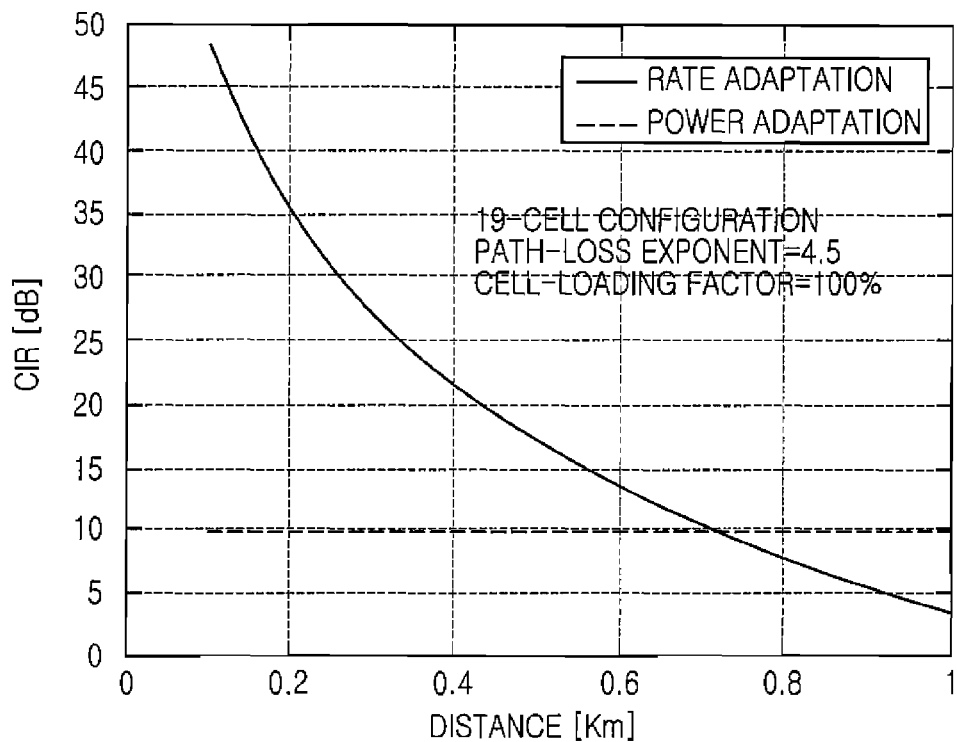
FIG. 1 is a graph comparing a rate adaptation scheme and a power adaptation scheme in terms of CIR.
Figure 2:
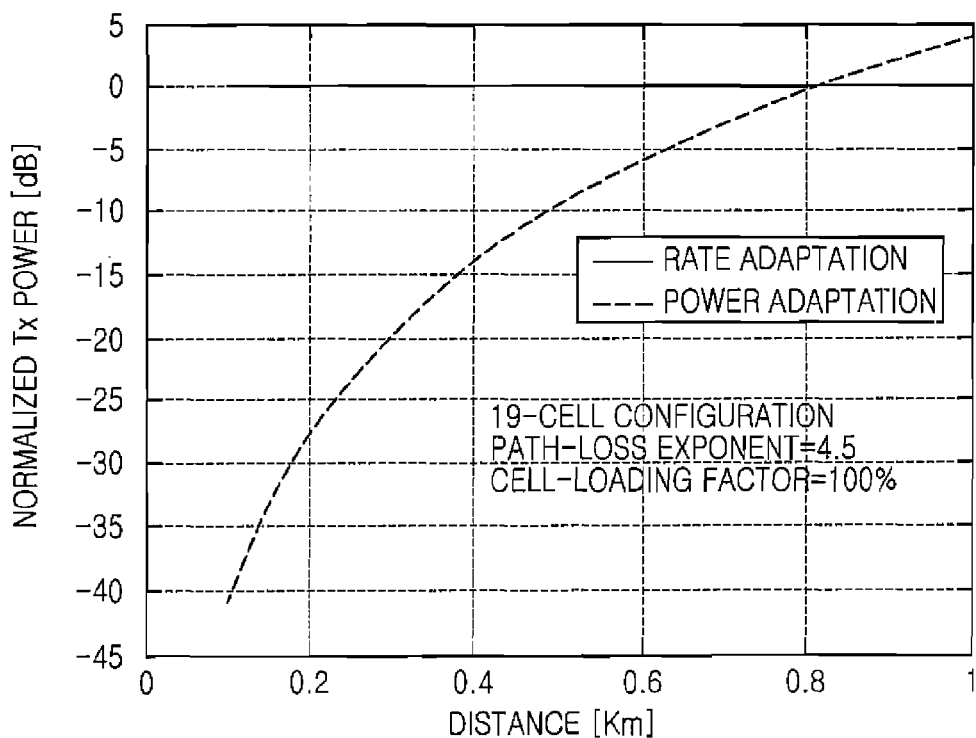
FIG. 2 is a graph comparing a rate adaptation scheme and a power adaptation scheme in terms of Tx power.
Figure 3:
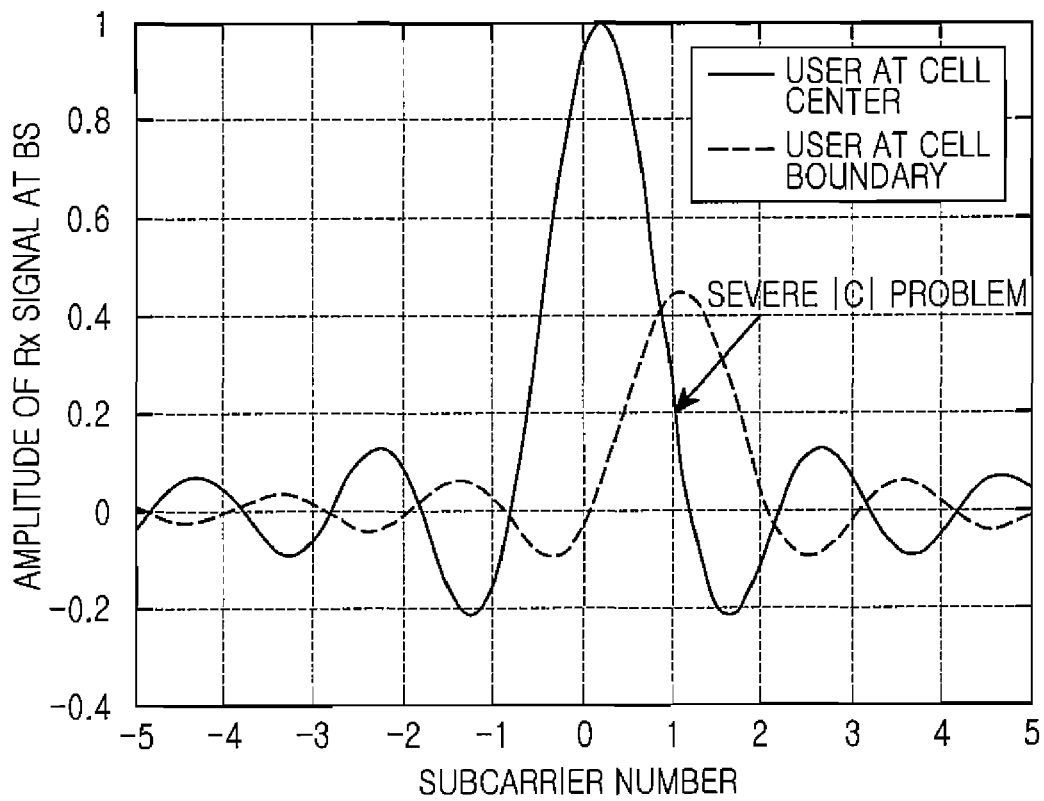
FIG. 3 is a graph illustrating a severe ICI problem that occurs due to the difference of BS Rx signal power between an MS located at the center of a cell and an MS located at the boundary of the cell when all the MSs in the cell transmit UL signals at the same Tx power.
Figure 4:
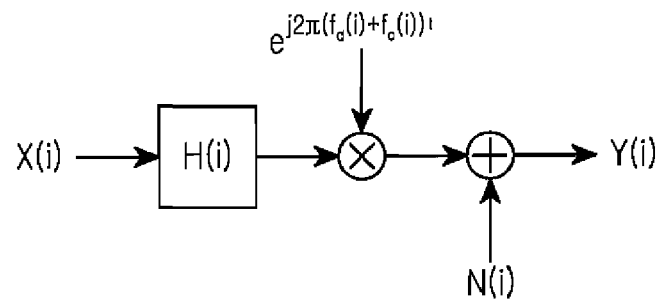
FIG. 4 illustrates a UL OFDM system model according to an exemplary embodiment of the present invention.

FIG. 4 illustrates a UL OFDM system model according to an exemplary embodiment of the present invention.

Referring to FIG. 4, an Rx information symbol of an MS using the $i^{th}$ subcarrier in an uplink can be expressed as Equation (1):

$$Y(i) = H(i)X(i)\sin c((f_d(i) + f_o(i))T) + N(i) \quad (1)$$

where $X(i)$ denotes an information symbol of an MS using the $i^{th}$ subcarrier, $H(i)$ denotes an MS channel, $N(i)$ denotes an additive noise, $f_d(i)$ denotes a Doppler frequency offset, $f_o(i)$ denotes an oscillator frequency offset, and T denotes an OFDM symbol length.

The power of ICI, on an MS using the $k^{th}$ subcarrier, that is caused by a Tx signal of the MS using the $i^{th}$ subcarrier can be expressed as Equation (2):

$$P_{ICI}(i,k) = |H(i)|^2 P_X(i)\operatorname{sinc}^2(k - i + (f_d(i) + f_o(i))T) \quad (2)$$

$$\cong |H(i)|^2 P_X(i)\operatorname{sinc}^2\left(k - i + \left(f_c \frac{v(i)}{c} + f_o(i)\right)T\right)$$

where $f_c$ denotes a center frequency, $v(i)$ denotes the speed of the MS using the $i^{th}$ subcarrier, and c denotes the speed of light.

As can be seen from Equation (2), the power of ICI on an MS, which is caused by another MS, is a function of the channel, speed and Tx power of the other MS.

If the maximum ICI power caused by each MS is $P_{ICI\_max}$, an MS using the $i^{th}$ subcarrier causing an ICI must always satisfy Equation (3):

$$P_{ICI} = \sum_{k=0, k \neq i}^{N_c-1} |H(i)|^2 P_X(i)\operatorname{sinc}^2(k - i + (f_d(i) + f_o(i))T) \leq P_{ICI\_max} \quad (3)$$

$$\forall i \in [0, N_c - 1], i \neq k$$

where $N_c$ denotes the number of subcarriers.

The total power of ICI on the MS using the $k^{th}$ subcarrier, which is caused by MS signals allocated to the other subcarriers, can be expressed as Equation (4):

$$P'_{ICI}(k) = \sum_{i=0, i \neq k}^{N_c-1} |H(i)|^2 P_X(i)\operatorname{sinc}^2(k - i + f_o(i)T) \quad (4)$$

A CIR loss that the MS using the $k^{th}$ subcarrier undergoes due to the total ICI power can be expressed as Equation (5):

$$\Delta\gamma(k) = \gamma(k) - 10\log_{10}\frac{|H(k)|^2 P_X(k)}{P_N(k) + P'_{ICI}(k)} \quad (5)$$

$$= 10\log_{10}\left[1 + \frac{P'_{ICI}(k)}{|H(k)|^2 P_X(k)} 10^{\frac{\gamma(k)}{10}}\right]$$

where $P_N(k)$ denotes a noise interference and $\gamma(k)$ denotes a CIR of the MS using the $k^{th}$ subcarrier when there is no loss due to an ICI.

The CIR $\gamma(k)$ can be expressed as Equation (6):

$$\gamma(k) = 10\log_{10}\frac{|H(k)|^2 P_X(k)}{P_N(k)} \quad (6)$$

where the unit of $\gamma(k)$ and $\Delta\gamma(k)$ is dB (decibel).

Equation (7) below must be satisfied so that a CIR loss of an MS allocated to the $k^{th}$ subcarrier is equal to or smaller than a maximum value.

$$\Delta\gamma(k) \leq \Delta\gamma_{max}, \forall k \in [0, N_c-1] \quad (7)$$

The maximum loss due to an ICI in the MS using the $k^{th}$ subcarrier corresponds to the case where an ICI is caused in another subcarrier by the amount of the maximum ICI power, which satisfies Equation (8):

$$P_{ICI}(i) = P_{ICI\_max}, \forall i \in [0, N_c-1], i \neq k \quad (8)$$

At this point, if the subcarrier number $N_c$ is large enough, Equation (9) below is satisfied.

$$P'_{ICI}(k) \approx P_{ICI\_max} \quad (9)$$

Accordingly, the MS using the $k^{th}$ subcarrier undergoes the maximum CIR loss expressed as Equation (10):

$$\Delta\gamma_{max} = 10\log_{10}\left[1 + \frac{P_{ICI\_max}}{|H(k)|^2 P_X(k)} 10^{\frac{\gamma(k)}{10}}\right] \quad (10)$$

$$= 10\log_{10}\left[1 + \frac{P_{ICI}(i)}{|H(k)|^2 P_X(k)} 10^{\frac{\gamma(k)}{10}}\right]$$

$$= 10\log_{10}\left[1 + \frac{|H(i)|^2 P_X(i)}{|H(k)|^2 P_X(k)}\right.$$

$$\left.\left\{\sum_{k=0, k \neq i}^{N_c-1} \operatorname{sinc}^2(k-i+f_o(i)T)\right\} 10^{\frac{\gamma(k)}{10}}\right]$$

At this point, if interference noises affecting the respective subcarriers are equalized to about the same value (i.e., $P_N(i) = P_N$), Equation (11) below is satisfied.

$$P_{ICI\_max} = \left(10^{\Delta\frac{\gamma_{max}}{10}} - 1\right) P_N \quad (11)$$

Then, Equation (10) can be expressed as Equation (12):

$$\Delta\gamma_{max} = 10\log_{10}\left[1 + \left\{\sum_{k=0, k \neq i}^{N_c-1} \operatorname{sinc}^2(k-i+f_o(i)T)\right\} 10^{\frac{\gamma(i)_{max}}{10}}\right] \quad (12)$$

where $\gamma(i)_{max}$ denotes a CIR of the $i^{th}$ subcarrier signal.

If the subcarrier number $N_c$ is large enough (e.g., $N_c > 60$), because it is not different from the case of $N_c \to \infty$, Equation (12) can be approximated as Equation (13):

$$\Delta\gamma_{max} \approx 10\log_{10}\left[1 + \left\{1 - \operatorname{sinc}^2((f_d(i) + f_o(i))T) 10^{\frac{\gamma(i)_{max}}{10}}\right\}\right] \quad (13)$$

Also, because $(f_d(i) + f_o(i))T \langle\langle 1$, Equation (13) can be approximated by the Taylor equation as Equation (14):

$$\Delta\gamma_{max} \cong 10\log_{10}\left[1 + \frac{\pi^2}{3}((f_d(i) + f_o(i))T)^{\frac{\gamma(i)_{max}}{10}}\right] \quad (14)$$

In addition, Equation (14) can be developed into a $\gamma(i)_{max}$ equation as Equation (15):

$$\gamma(i)_{max} = 10\log_{10}\left(\frac{3}{\pi^2} \frac{10^{\frac{\Delta\gamma_{max}}{10}} - 1}{\left(\left(f_c \frac{v(i)}{c} + f_{o\_max}\right)T\right)^2}\right) \quad (15)$$

where $f_{o\_max}$ is the maximum allowable value of $f_o(i)$ that is a frequency offset estimation error or jitter that is present even after frequency offset estimation.

In Equation (15), $f_{o\_max}$ is substituted for $f_o(i)$ because $f_o(i)$ is not possible to estimate.

Therefore, the amount of CIR loss affecting other MSs can be adjusted by adjusting the Tx power of an MS allocated to the $i^{th}$ subcarrier depending on a channel gain $H(i)$ and a speed $v(i)$, as expressed in Equation (16):

$$P_X(i)_{max} = \frac{P_N}{|H(i)|^2}\left(\frac{3}{\pi^2} \frac{10^{\frac{\Delta\gamma_{max}}{10}} - 1}{\left(\left(f_c \frac{v(i)}{c} + f_{o\_max}\right)T\right)^2}\right) \quad (16)$$

Hereinafter, exemplary embodiments of the present invention will be described in detail with reference to the accompanying drawings.

Figure 5:
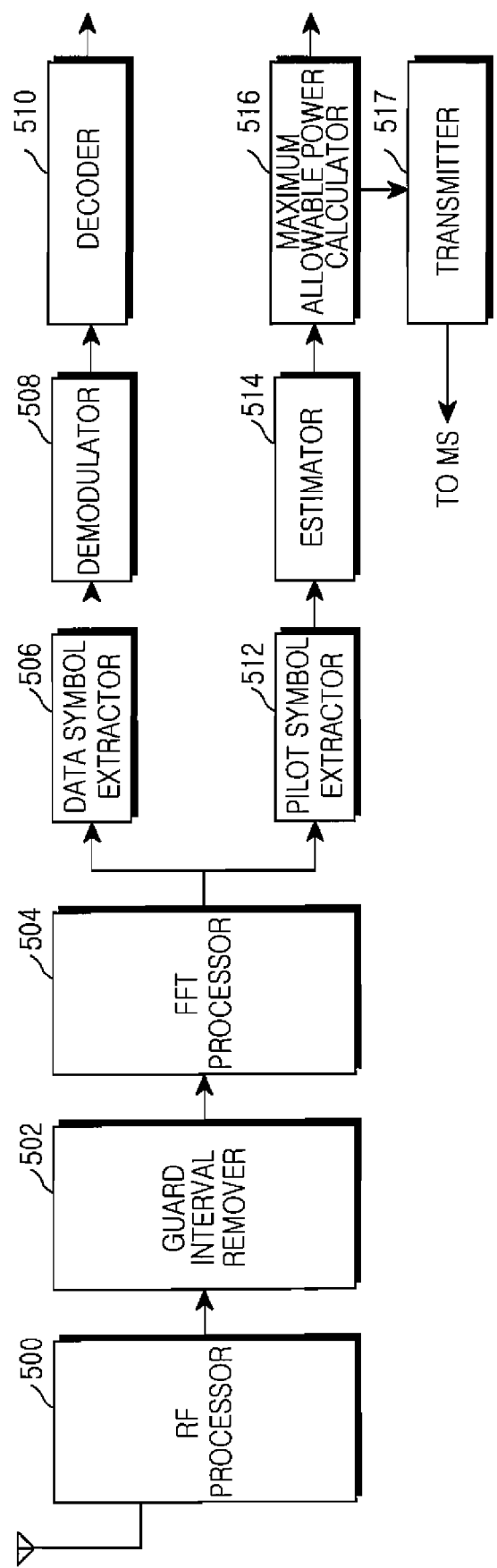
FIG. 5 is a block diagram of a BS in a BWA system according to an exemplary embodiment of the present invention.

FIG. 5 illustrates a block diagram of a BS in a BWA system according to an exemplary embodiment of the present invention.

Referring to FIG. 5, the BS includes a radio-frequency (RF) processor 500, a guard interval remover 502, a Fast Fourier Transform (FFT) processor 504, a data symbol extractor 506, a demodulator 508, a decoder 510, a pilot symbol extractor 512, an estimator 514, a maximum allowable power calculator 516, and a transmitter 517. The exemplary embodiment illustrated in FIG. 5 focuses on a structure for receiving UL signals.

The RF processor 500 includes a front-end unit and a filter. The RF processor 500 converts an RF signal received over a radio channel into a baseband signal, and converts an analog baseband signal into a digital signal prior to output. The guard interval remover 502 removes a guard interval (e.g., a cyclic prefix (CP)) from sample data received from the RF processor 500, to output the resulting sample data. The FFT processor 504 FFT-processes the sample data received from the guard interval remover 502, to output the resulting frequency-domain data.

The data symbol extractor 506 extracts data symbols from the frequency-domain data received from the FFT processor 504 to output the extracted data symbols. The demodulator 508 demodulates the data symbols received from the data symbol extractor 506 by using a modulation scheme to output coded data. The decoder 510 decodes the coded data received from the demodulator 508 using a coding scheme to restore original information data.

The pilot symbol extractor 512 extracts pilot symbols (or sounding signals) from the frequency-domain data received from the FFT processor 504 to output the extracted pilot symbols. Using the pilot symbols received from the pilot symbol extractor 512, the estimator 514 estimates the UL channel gain, noise power and speed of each MS. In an exemplary embodiment, the speed of an MS may be estimated by the MS using a pilot signal transmitted over a downlink (DL) channel. In this case, the MS must feed the estimated speed back to the BS. Algorithms for estimating the channel gain, the noise power and the speed are well known to those skilled in the art, and thus their description will be omitted for conciseness.

Using the UL channel gain, noise power and speed of each MS received from the estimator 514, the maximum allowable power calculator 516 calculates the maximum allowable power $P_X(i)_{max}$ for the corresponding MS. The maximum allowable power $P_X(i)_{max}$ for the MS using the $i^{th}$ subcarrier may be calculated using Equation (16).

The transmitter 517 transmits the maximum allowable power received from the maximum allowable power calculator 516 to the corresponding MS. Although not illustrated in FIG. 5, an exemplary transmitter 517 may include a unit for generating a message of an upper layer (e.g., a MAC layer) and physical-layer units (e.g., an encoder, a modulator, an IFFT processor, a guard interval inserter, and an RF processor) for processing the upper-layer message to be suitable for actual transmission.

Figure 6:
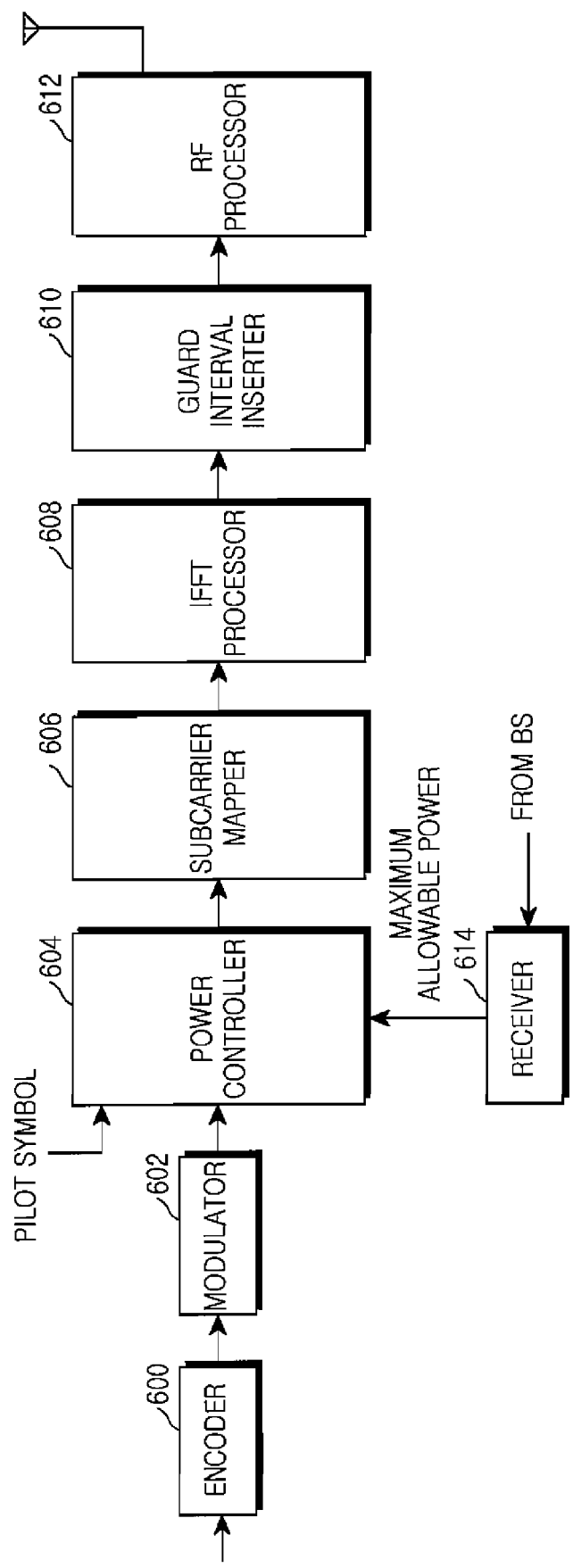
FIG. 6 is a block diagram of an MS in a BWA system according to an exemplary embodiment of the present invention.

FIG. 6 is a block diagram of an MS in a BWA system according to an exemplary embodiment of the present invention.

Referring to FIG. 6, the MS includes an encoder 600, a modulator 602, a power controller 604, a subcarrier mapper 606, an Inverse Fast Fourier Transform (IFFT) processor 608, a guard interval inserter 610, an RF processor 612, and a receiver 614. The exemplary embodiment illustrated in FIG. 6 focuses on a structure for transmitting UL signals.

The encoder 600 encodes an input information bit stream at a coding rate to output coded data (bits). Examples of the encoder 600 include a convolutional encoder, a turbo encoder, and a low-density parity-check (LDPC) encoder.

The modulator 602 modulates symbols received from the encoder 600 using a modulation scheme (modulation order) to output complex symbols. Examples of the modulation scheme include Binary Phase Shift Keying (BPSK) that maps one bit (s=1) to one signal point (complex symbol), Quadrature Phase Shift Keying (QPSK0 that maps two bits (s=2) to one complex symbol, 8-ary Phase Shift Keying (8PSK) that that maps three bits (s=3) to one complex symbol, 16-ary Quadrature Amplitude Modulation (16QAM) that that maps four bits (s=4) to one complex symbol, and 64QAM that that maps six bits (s=6) to one complex symbol.

The receiver 614 analyzes a message received from a BS to detect information regarding the maximum allowable power, and provides the detected maximum allowable power information to the power controller 604. According to the maximum allowable power information provided by the receiver 614, the power controller 604 controls the Tx power (or amplitude) of data symbols and pilot symbols received from the modulator 602.

The subcarrier mapper 606 maps the symbols received from the power controller 604 to subcarriers. In an exemplary embodiment, the mapping of the symbols to the subcarriers is performed by providing each of the symbols to the corresponding input (subcarrier position) of the IFFT processor 608. The IFFT processor 608 IFFT-processes the symbols received from the subcarrier mapper 606 to output time-domain sample data.

The guard interval inserter 610 inserts a guard interval (e.g., a CP) into the sample data received from the IFFT processor 608 to output the resulting OFDM symbol. The RF processor 612 converts the OFDM symbol received from the guard interval inserter 610 into a baseband analog signal, RF-processes the analog signal to be suitable for actual transmission, and transmits the resulting signal over a radio channel through a Tx antenna.

Figure 7:
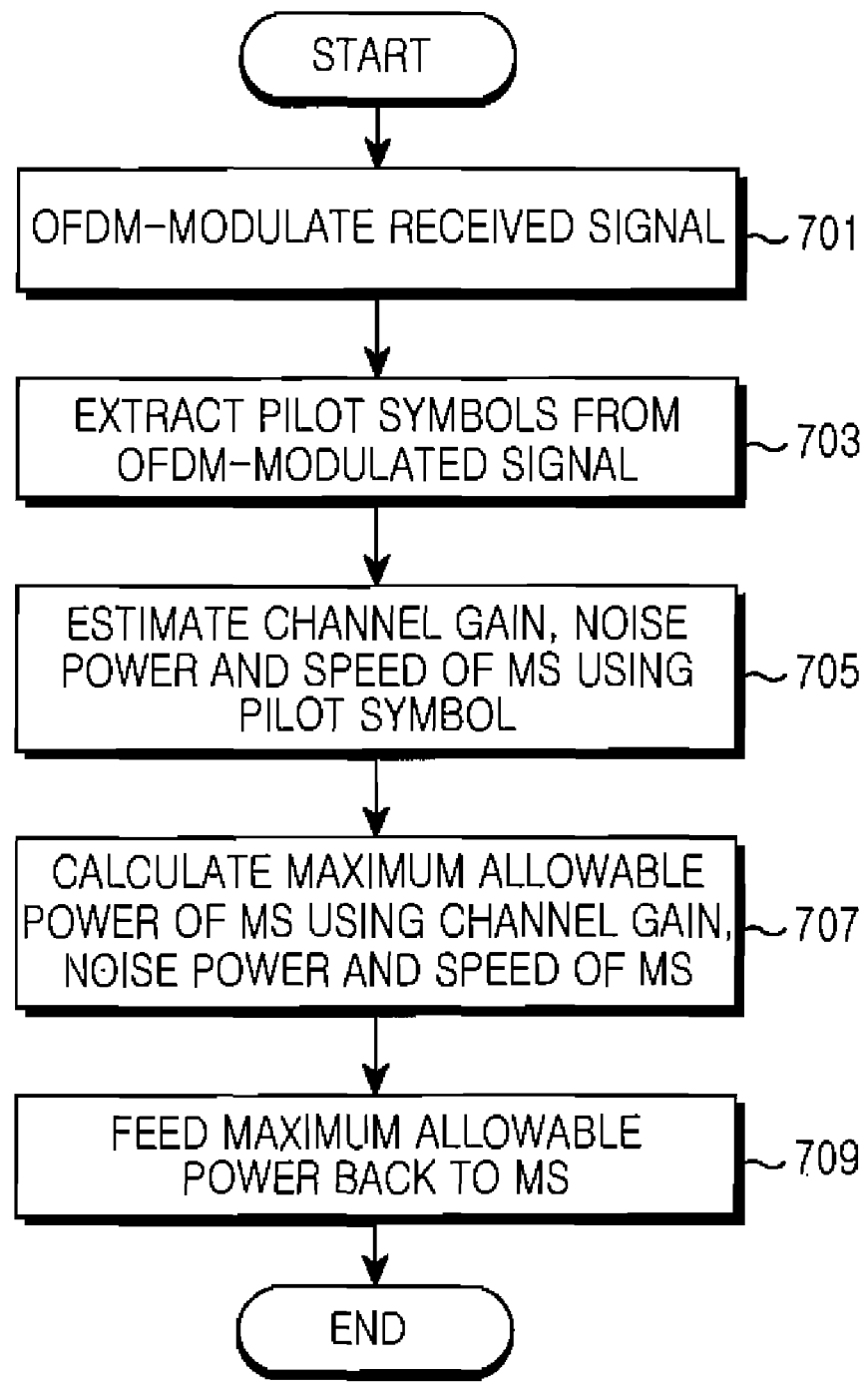
FIG. 7 is a flowchart illustrating an operation of a BS in a BWA system according to an exemplary embodiment of the present invention.

FIG. 7 is a flowchart illustrating an operation of a BS in a BWA system according to an exemplary embodiment of the present invention.

As illustrated in FIG. 7, according to an exemplary embodiment of the present invention, the BS OFDM-modulates a received UL signal in step 701. In step 703, the BS extracts pilot symbols from the OFDM-modulated signal.

In step 705, the BS estimates the channel gain, noise power and speed of each MS using the extracted pilot symbols. In an exemplary embodiment, the speed of an MS may be estimated by the MS using a pilot signal transmitted over a DL channel. In this case, the MS must feed the estimated speed back to the BS. Algorithms for estimating the channel gain, the noise power and the speed are well known to those skilled in the art, and thus their description will be omitted for conciseness.

In step 707, the BS calculates the maximum allowable power of each MS using the estimated channel gain, noise power and speed. The UL maximum allowable power $P_X(i)_{max}$ for the MS using the $i^{th}$ subcarrier may be calculated using Equation (16).

In step 709, the BS feeds the calculated maximum allowable power back to the corresponding MS.

Figure 8:
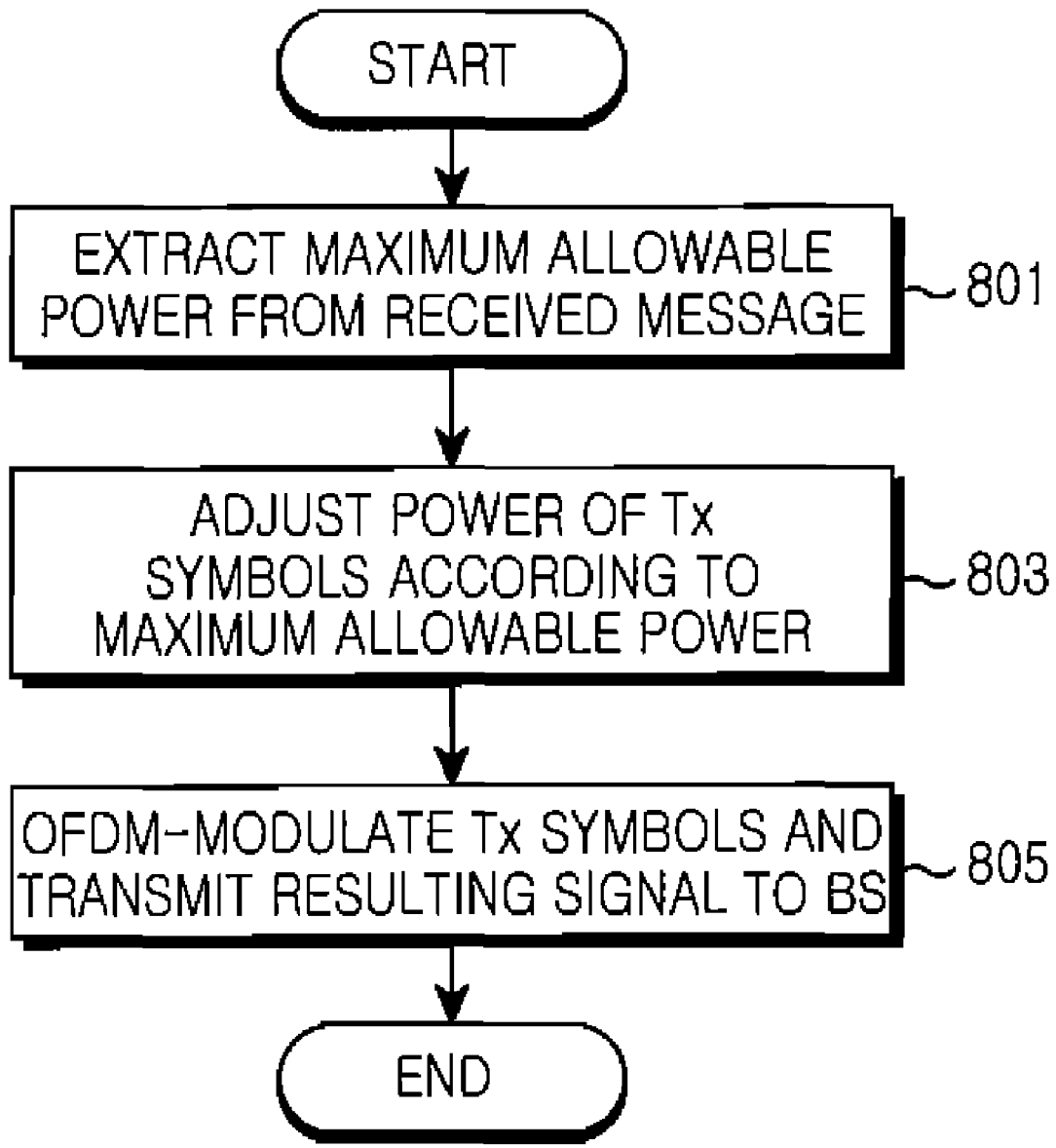
FIG. 8 is a flowchart illustrating an operation of an MS in a BWA system according to an exemplary embodiment of the present invention.

FIG. 8 is a flowchart illustrating an operation of an MS in a BWA system according to an exemplary embodiment of the present invention.

Referring to FIG. 8, in step 801, the MS analyzes a message received from a BS to obtain information regarding the maximum allowable power. In step 803, the MS adjusts the power (or amplitude) of Tx symbols (data symbols and pilot symbols) according to the obtained maximum allowable power information.

In step 805, the MS OFDM-modulates the Tx symbols and transmits the resulting signal to the BS.

In the above exemplary embodiment, the BS calculates the maximum allowable power and feeds the calculated maximum allowable power back to the MS. In another exemplary embodiment, the BS feeds a UL channel value back to the MS, and the MS calculates the maximum allowable power using the UL channel value.

A description will now be given of an exemplary application for better understanding of the present invention.

In an exemplary application, a BWA system is provided with UL parameters as shown in Table 1 below.

TABLE 1

| Parameter | Value |
|---|---|
| Carrier Frequency | 5.8 GHz |
| Bandwidth | 25 MHz |
| Symbol Length | 20.48 μsec |
| Number of Subcarriers | 512 |
| Tolerable Freq. Instability | 0.1 ppm |

Figure 9:
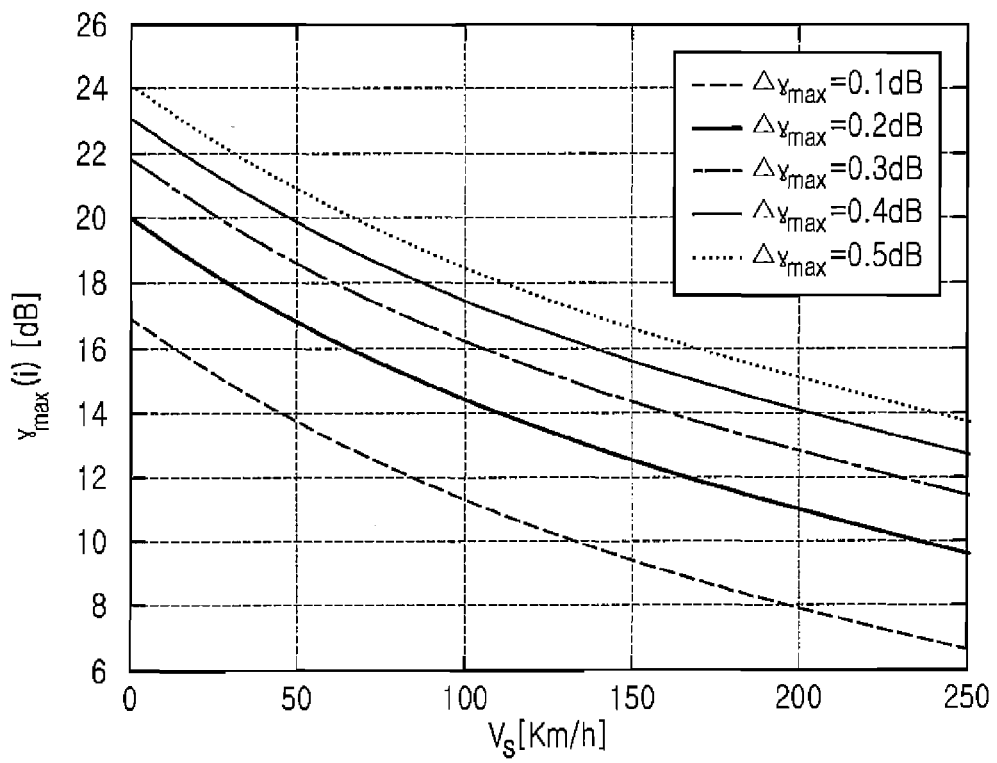
FIG. 9 is a graph illustrating the maximum allowable CIR depending on the speed of each MS in a BWA system with UL parameters shown in Table 1.

FIG. 9 is a graph illustrating the maximum allowable CIR ($\gamma(i)_{max}$) depending on the speed of each MS in a BWA system with UL parameters shown in Table 1.

The graph of FIG. 9 illustrates the maximum allowable CIR depending on the speed of each MS based on Equation (15). That is, the graph of FIG. 9 illustrates CIRs that are obtained by adjusting the Tx power according to the speed and the channel gain depending on the distance from the BS as expressed in Equation (16). As can be seen from FIG. 9, as the speed of an MS increases, the maximum allowable CIR $\gamma(i)_{max}$ decreases and thus the Tx power reduces. It can also be seen that the maximum allowable CIR increases as the maximum CIR loss $\Delta\gamma_{max}$ due to an ICI increases.

Figure 10:
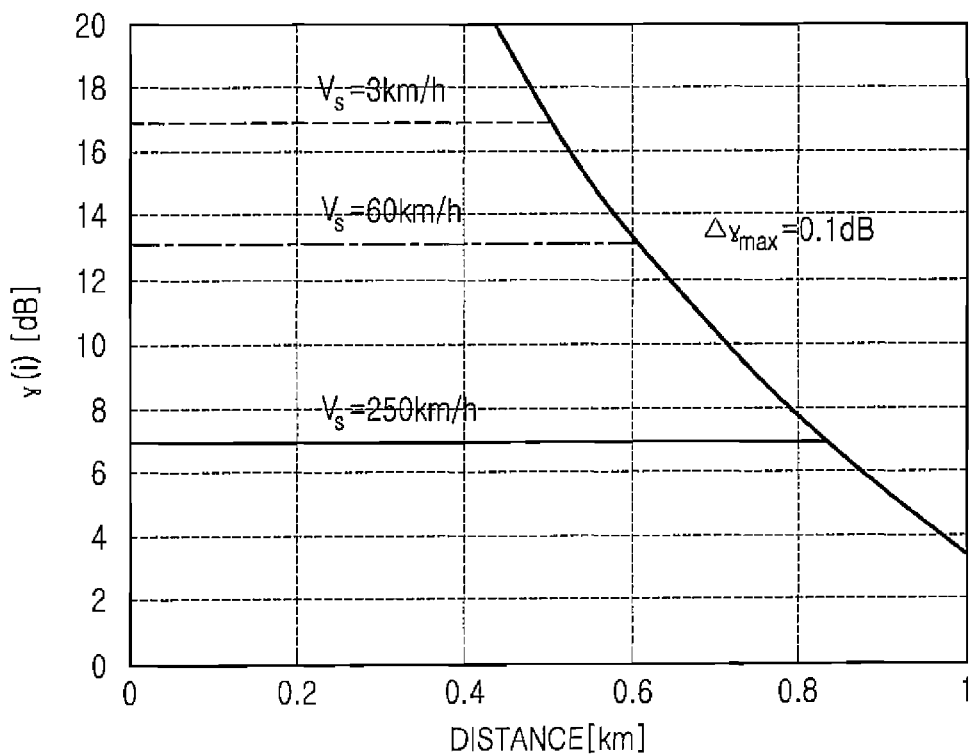
FIG. 10 is a graph illustrating a CIR adjusted according to the speed of each MS in a BWA system with the UL parameters shown in Table 1.
Figure 11:
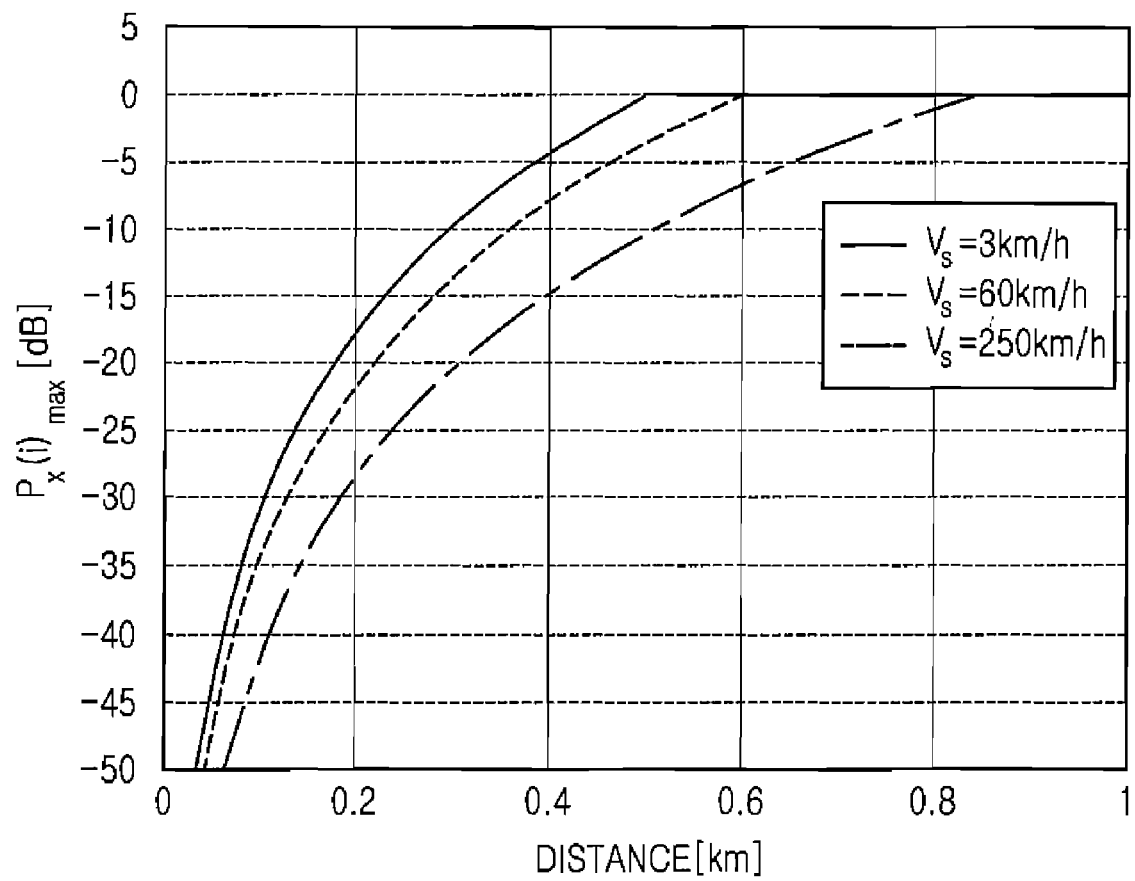
FIG. 11 is a graph illustrating Tx power depending on the distance from a BS in a BWA system with the UL parameters shown in Table 1.

FIG. 10 is a graph illustrating a CIR adjusted according to the speed of each MS, and FIG. 11 is a graph illustrating Tx power depending on the distance from a BS.

As illustrated in FIGS. 10 and 11, if $\Delta\gamma_{max}$ is 0.1 dB as an example, a slow MS with a speed of 3 km/h has the maximum allowable CIR $\gamma(i)_{max}$ of 16.7 dB. In this case, the Tx power of the MS with a distance of less than 0.5 km from the BS must be reduced according to the distance (or the channel gain) in order to satisfy the $\gamma(i)_{max}$ (=16.7 dB). As another example, a speedy MS with a speed of 250 km/h has the maximum allowable CIR $\gamma(i)_{max}$ of about 6.6 dB. In this case, the Tx power of the MS with a distance of less than 0.85 km from the BS must be reduced according to the distance in order to satisfy the $\gamma(i)_{max}$ (=6.5 dB).

A description will now be given of the performance of the scheme according to an exemplary embodiment of the present invention.

In the UL conditions of the BWA system with the UL parameters shown in Table 1, the system performance for the MS location and speed shown in Table 2 is shown in Table 3.

TABLE 2

| Experimental Environment | Value |
|---|---|
| MS Location Distribution | Uniform Distribution |
| MS Speed Distribution | Pedestrian (3 km/h): 70% |
| | Medium-Speed Mobile (60 km/h): 20% |
| | High-Speed Mobile (250 km/h): 10% |

TABLE 3

| Scheme | Spectral Efficiency [bps/Hz] |
|---|---|
| Power Adaptation Scheme | 3.3506 |
| Present Invention Scheme | 3.9291 |

As shown in Table 2, it is assumed that the user location distribution is uniform and the ratio of pedestrian to medium-speed mobile to high-speed mobile is 7:2:1. In this case, as can be seen from Table 3, the scheme according to the present invention can increase the spectral efficiency by 0.5785 bps/Hz, on average, when compared with the conventional power adaptation scheme.

As described above, exemplary embodiments of the present invention provide the scheme for solving the ICI problem in the uplink of the OFDMA system. The exemplary embodiments set the maximum ICI power caused by each subcarrier, and adjusts the UL power such that the CIR loss for a subcarrier signal is equal to or smaller than a maximum value, thereby making it possible to effectively apply the rate adaptation scheme to the uplink of the OFDMA system. The scheme according to exemplary embodiments of the present invention can provide higher system capacity than the conventional power adaptation scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A base station (BS) apparatus in a wireless access system, comprising:
    a determiner for determining channel gain, noise power and speed of each mobile station (MS) of a plurality of MSs; and
    a calculator for calculating the maximum allowable power of each MS of the plurality of MSs using the determined channel gain, noise power and speed of each MS,
    wherein the determiner comprises:
        an Orthogonal Frequency Division Multiplexing (OFDM) modulator for OFDM-modulating a received UL signal,
        an extractor for extracting pilots symbols from a frequency-domain signal received from the OFDM modulator, and
        an estimator for estimating the channel gain, noise power and speed of each MS of the plurality of MSs using the pilot symbols received from the extractor.

2. The BS apparatus of claim 1, wherein the determining of the channel gain, the noise power and the speed comprises estimating the channel gain, the noise power and the speed using uplink (UL) pilot symbols.

3. The BS apparatus of claim 1, wherein the determining of the channel gain and the noise power comprises estimating the channel gain and the noise power using UL pilot symbols, and further wherein the determining of the speed comprises feeding back the speed from the MS.

4. The BS apparatus of claim 1, wherein the calculator calculates the maximum allowable power $P_X(i)_{max}$ using the following Equation:

$$P_X(i)_{max} = \frac{P_N}{|H(i)|^2}\left(\frac{3}{\pi^2}\frac{10^{\frac{\Delta\gamma_{max}}{10}}-1}{\left(\left(f_c\frac{v(i)}{c}+f_{o\_max}\right)T\right)^2}\right)$$

where $P_N$ denotes noise power, $H(i)$ denotes channel gain, $\Delta\gamma_{max}$ denotes a maximum CIR loss, $f_c$ denotes center frequency, $v(i)$ denotes speed, $c$ denotes the speed of light, $f_{o\_max}$ denotes a frequency offset estimation error, and $T$ denotes an OFDM symbol length.

5. The BS apparatus of claim 1, further comprising a transmitter for transmitting the maximum allowable power calculated by the calculator to a corresponding MS.

6. A mobile station (MS) apparatus in a wireless access system, comprising:
    a receiver for receiving maximum allowable power information corresponding to at least one of an uplink (UL) channel gain of the MS and a speed of the MS;
    a generator for generating Tx symbols;
    a power controller for controlling a Tx power of the generated Tx symbols according to the received maximum allowable power information;
    an Inverse Fast Fourier Transform (IFFT) processor for IFFT-processing the Tx symbols received from the power controller; and
    a radio-frequency (RF) processor for RF-processing sample data received from the IFFT processor.

7. The MS apparatus of claim 6, wherein the generator comprises:
    an encoder for encoding Tx data; and
    a modulator for modulating the encoded data received from the encoder.

8. The MS apparatus of claim 6, wherein the maximum allowable power information $P_X(i)_{max}$ is calculated using the following Equation:

$$P_X(i)_{max} = \frac{P_N}{|H(i)|^2}\left(\frac{3}{\pi^2}\frac{10^{\frac{\Delta\gamma_{max}}{10}}-1}{\left(\left(f_c\frac{v(i)}{c}+f_{o\_max}\right)T\right)^2}\right)$$

where $P_N$ denotes a noise power, $H(i)$ denotes the channel gain, $\Delta\gamma_{max}$ denotes a maximum CIR loss, $f_c$ denotes a center frequency, $v(i)$ denotes the speed of the MS, $c$ denotes the speed of light, $f_{o\_max}$ denotes a frequency offset estimation error, and $T$ denotes an OFDM symbol length.

9. A mobile station (MS) apparatus in a wireless access system, comprising:
    an estimator for estimating a speed of the MS;
    a determiner for determining a channel gain and a noise power using an uplink (UL) channel value received from a base station (BS);

a calculator for calculating a maximum allowable power using at least one of the channel gain, the noise power and the speed of the MS;

a power controller for controlling a Tx power of Tx symbols according to the calculated maximum allowable power;

an Inverse Fast Fourier Transform (IFFT) processor for IFFT-processing the Tx symbols received from the power controller; and a radio-frequency (RF) processor for RF-processing sample data received from the IFFT processor.

10. The MS apparatus of claim 9, wherein the calculator calculates the maximum allowable power $P_X(i)_{max}$ using the following Equation:

$$P_X(i)_{max} = \frac{P_N}{|H(i)|^2} \left( \frac{3}{\pi^2} \frac{10^{\frac{\Delta\gamma_{max}}{10}} - 1}{\left(\left(f_c \frac{v(i)}{c} + f_{o\_max}\right)T\right)^2} \right)$$

where $P_N$ denotes a noise power, H(i) denotes the channel gain, $\Delta\gamma_{max}$ denotes the maximum CIR loss, $f_c$ denotes center frequency, v(i) denotes speed, c denotes the speed of light, $f_{o\_max}$ denotes a frequency offset estimation error, and T denotes an OFDM symbol length.

11. A communication method for a base station (BS) in a wireless access system, the method comprising:

determining a channel gain, a noise power and a speed of each mobile station (MS) of a plurality of MSs;

calculating a maximum allowable power of each MS using the determined channel gain, noise power and speed of each MS;

Orthogonal Frequency Division Multiplexing (OFDM)-modulating a received UL signal;

extracting pilots symbols from the OFDM-modulated signal; and estimating the channel gain, noise power and speed of each MS using the extracted pilot symbols.

12. The communication method of claim 11, wherein the determining of the channel gain, the noise power, and the speed comprises estimating the channel gain, the noise power, and the speed using uplink (UL) pilot symbols.

13. The communication method of claim 11, wherein the determining of the channel gain and the noise power comprises estimating the channel gain and the noise power using UL pilot symbols, and further wherein the determining of the speed comprises receiving the speed fed back from the MS.

14. The communication method of claim 11, wherein the maximum allowable power $P_X(i)_{max}$ is calculated using the following Equation:

$$P_X(i)_{max} = \frac{P_N}{|H(i)|^2} \left( \frac{3}{\pi^2} \frac{10^{\frac{\Delta\gamma_{max}}{10}} - 1}{\left(\left(f_c \frac{v(i)}{c} + f_{o\_max}\right)T\right)^2} \right)$$

where $P_N$ denotes the noise power, H(i) denotes the channel gain, $\Delta\gamma_{max}$ denotes the a maximum CIR loss, $f_c$ denotes a center frequency, v(i) denotes the speed, c denotes the speed of light, $f_{o\_max}$ denotes a frequency offset estimation error, and T denotes an OFDM symbol length.

15. The communication method of claim 11, further comprising transmitting the calculated maximum allowable power to the corresponding MS.

16. A communication method for a mobile station (MS) in a wireless access system, the method comprising:

receiving maximum allowable power information that is determined according to at least one of an uplink (UL) channel gain of the MS and a speed of the MS;

generating Tx symbols;

controlling a Tx power of the generated Tx symbols according to the received maximum allowable power information;

Inverse Fast Fourier Transform (IFFT)-processing the power-controlled Tx symbols to generate sample data; and radio-frequency (RF)-processing the generated sample data to transmit the resulting data to the BS.

17. The communication method of claim 16, wherein the generating of the TX symbols comprises:

encoding Tx data; and modulating the encoded data to generate the Tx symbols.

18. The communication method of claim 16, wherein the maximum allowable power information $P_X(i)_{max}$ is calculated using the following Equation:

$$P_X(i)_{max} = \frac{P_N}{|H(i)|^2} \left( \frac{3}{\pi^2} \frac{10^{\frac{\Delta\gamma_{max}}{10}} - 1}{\left(\left(f_c \frac{v(i)}{c} + f_{o\_max}\right)T\right)^2} \right)$$

where $P_N$ denotes a noise power, H(i) denotes the channel gain, $\Delta\gamma_{max}$ denotes a maximum CIR loss, $f_c$ denotes a center frequency, v(i) denotes the speed of the MS, c denotes the speed of light, $f_{o\_max}$ denotes a frequency offset estimation error, and T denotes an OFDM symbol length.

19. A communication method for a mobile station (MS) in a wireless access system, comprising:

estimating a speed of the MS;

determining a channel gain and a noise power using an uplink (UL) channel value received from a base station (BS);

calculating a maximum allowable power using at least one of the channel gain, the noise power and the speed of the MS;

controlling a Tx power of Tx symbols according to the calculated maximum allowable power;

Inverse Fast Fourier Transform (IFFT)-processing the power-controlled Tx symbols to generate sample data; and radio-frequency (RF)-processing the generated sample data to transmit the resulting data to the BS.

20. The communication method of claim 19, wherein the maximum allowable power $P_X(i)_{max}$ is calculated using the following Equation:

$$P_X(i)_{max} = \frac{P_N}{|H(i)|^2} \left( \frac{3}{\pi^2} \frac{10^{\frac{\Delta\gamma_{max}}{10}} - 1}{\left(\left(f_c \frac{v(i)}{c} + f_{o\_max}\right)T\right)^2} \right)$$

where $P_N$ denotes the noise power, H(i) denotes the channel gain, $\Delta\gamma_{max}$ denotes a maximum CIR loss, $f_c$ denotes a center frequency, v(i) denotes the speed of the MS, c denotes the speed of light, $f_{o\_max}$ denotes a frequency offset estimation error, and T denotes an OFDM symbol length.

* * * * *